March 29, 1960     O. C. FROM     2,930,974
MAGNETIC FIELD DETECTING DEVICE
Filed Aug. 1, 1957
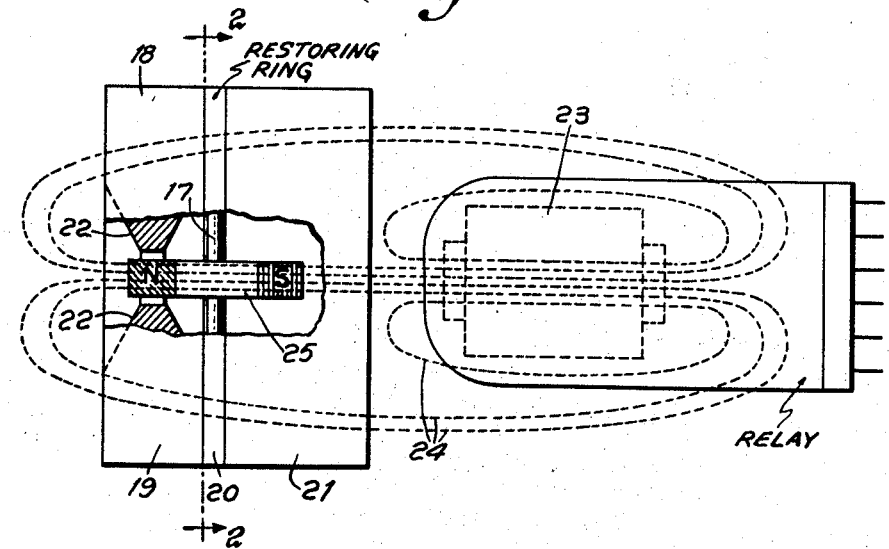
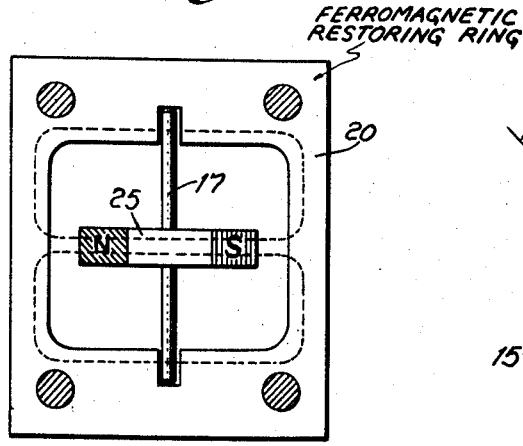
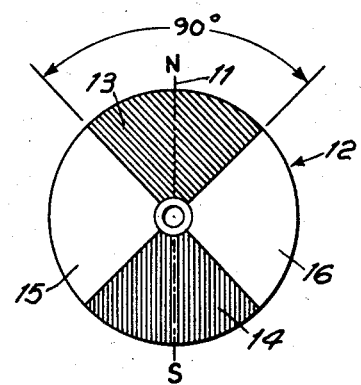
Inventor
OWEN C. FROM
By Philip M. Bolton
Attorney

United States Patent Office 2,930,974
Patented Mar. 29, 1960

2,930,974

MAGNETIC FIELD DETECTING DEVICE

Owen C. From, East Orange, N.J., assignor to International Telephone and Telegraph Corporation, Nutley, N.J., a corporation of Maryland Application August 1, 1957, Serial No. 675,603

9 Claims. (Cl. 324—48)

This invention relates to a device for determining the presence and direction of magnetic fields and, in particular, to a device used to determine the energization condition of a relay.

With the use of electrically controlled equipment, there is a requisite for components which are miniaturized, closely packaged and hermetically sealed. With such equipment, the production and maintenance problem is increased by the inaccessibility of the components, which is typified by hermetically sealed elements. One of the serious maintenance problems in connection with this equipment is the determination of the condition of energization of a hermetically sealed relay or an inaccessible relay. Very often a maintenance technician, who is testing this type of equipment under dynamic or simulated conditions, is desirous of knowing whether a particular relay is in a state of being energized. The present techniques employ the use of probes, whereby the maintenance technician attempts to set two probes of a voltmeter on terminals from a relay to determine whether or not this particular relay is energized. This technique is undesirable for obvious reasons, such as the fact that the maintenance technician very often shorts out terminals in the circuitry when attempting to position the probes on the proper relay terminals or the terminals may not be accessible. It follows that it would be desirable to have a device which could detect the energization condition of a hermetically sealed relay or an inaccessible relay which would not involve these cumbersome and undesirable techniques.

It is therefore an object of the present invention to provide a simple improved device for detecting magnetic fields.

It is a further object of the present invention to provide a device which can be used to readily perform repetitive determinations of magnetic fields.

It is a still further object of the present device to provide a tool for determining the energization conditions of a hermetically sealed or inaccessible relay in electrical circuitry.

In accordance with a main feature of the present invention, there is provided a movable magnet mounted in a housing for movement whenever said housing is placed in a magnetic field.

In accordance with another main feature of the present invention, there is provided a ferromagnetic material element inserted in the housing to provide an optimum flux path from the north pole to the south pole of the movable magnet, thus, causing the movable magnet to return to a restored position when said housing is not positioned in a magnetic field.

In accordance with another feature of the present invention, there is provided on the movable magnet, described in the first feature above, three indicia to indicate whether the pole of the magnetic field detected is a north pole, a south pole or there is no field at all.

Other and further objects of the present invention will become apparent and the foregoing will be better understood with reference to the following description of an embodiment thereof, references being had to the drawings in which:

Fig. 1 is a side elevation view partially broken and showing the magnetic field detecting device with the alignment of the disk of Fig. 3 when the housing is placed adjacent to a hermetically sealed relay which is energized;

Fig. 2 is a front elevation view of the ferromagnetic material restoring ring with the disk in the neutral field position; and Fig. 3 is a pictorial schematic of a disk used in the preferred embodiment of the magnetic field detecting device which has been magnetized along one diameter.

Referring particularly to Fig. 3, there is shown a disk, which can be made of Alnico material, which has been magnetized along the diameter 11 to characterize the disk 12 with a north and a south pole. A segment 13 of the disk has been painted green to indicate a north pole, while another segment 14 has been painted red to indicate a south pole. The two neutral sections 15 and 16 have been painted white. The disk is mounted on a shaft, as shown in Fig. 1, at 17 and the shaft is positioned on pivots, not shown, in a housing 18. The housing 18 is made up of three sections, 19, 20 and 21. The sections 19 and 21 are made of some non-ferromagnetic material such as brass or plastic. The section 20 is made up of a ferromagnetic material such as iron, as indicated in Fig. 2. A portion of the housing is removed as indicated by the beveled portions 22 to provide a window means whereby the indications on the disk may be observed. As seen from the Fig. 1, when the hermetically sealed relay 23 is energized, a north pole is found in the left hand side and the lines of flux pass therefrom and return as shown by the lines of flux 24. The lines of flux pass through the housing 18 to align the disk 25, as shown in Fig. 1, with the south pole of the disk adjacent the north pole of the relay. The user of the device will observe a green indication through the window cutout 22 to indicate that the hermetically sealed relay 23 is energized and has a north pole facing the top end of the relay. If the relay 23 had been energized, such that a south pole appeared on the left hand side, the disk 25 reverses such that the user observes a red indication at the window cutout 22.

Fig. 2 shows the condition of the disk when the hermetically sealed relay or the magnetic field has been removed. Since the restoring ring provides the optimum flux path, the disk 25 will rotate on the shaft 17 to be aligned with this optimum flux path as shown in Fig. 2. It is clear with the disk 25 in the position shown as in Fig. 2, the white sections 15 and 16 of Fig. 3 will be read by the user through the window cutout 22 of Fig. 1. This restoring operation insures that when the device is used for repetitive observations of relays, if there is a magnetic field to be determined, there will be a movement noted. This movement might not have been noted if the disk were allowed to stay in the position shown in Fig. 1 and there was a subsequent reading of a magnetic field with a north pole. The field strength of the magnet of disk 12 or 25, obviously, is of sufficient strength such that the earth's magnetic field is ineffective to alter the magnetic from its return to neutral field position.

While I have described above the principles of my invention in connection with specific apparatus, it is to be clearly understood that this description is made only by way of example and not as a limitation to the scope of my invention as set forth in the objects thereof and in the accompanying claims.

I claim:

1. A device for determining a magnetic field comprising a balanced movable magnetized member having a north pole and a south pole characteristic, a housing means arranged to hold said movable member for movement to a given position when said housing means is located in a magnetic field, and a non-magnetized ferromagnetic member of a length approaching at least the spacing between the north and south pole positions of said magnetized members disposed in association with said housing means to provide an optimum flux path from said north pole to said south pole to cause said movable member to assume another position different from said given position when said housing is not located in a magnetic field.

2. A device for determining a magnetic field comprising a balanced movable magnetized member having a north pole and a south pole characteristic, a housing means arranged to hold said movable member for movement to a first and second position when said housing means is disposed in a magnetic field, said first position representing a magnetic field whose flux lines are polarized in a first direction, said second position representing a magnetic field whose flux lines are polarized in a second direction, and a non-magnetized ferromagnetic member of a length approaching at least the spacing between the north and south pole positions of said magnetized members disposed in association with said housing to provide an optimum flux path from said north pole to said south pole to cause said movable member to assume a third position different from either said first or said second positions when said housing means is not disposed in a magnetic field.

3. A device for determining a magnetic field comprising a balanced movable magnetized member having first, second and third indicia respectively representing a north pole position, a south pole position and a neutral magnetic field position, housing means having a window device through which to observe said indicia, said housing means arranged to hold said movable member for movement to position said first, second or third indicia before said window when said housing means is positioned, respectively, in a magnetic field proximate a north pole, a magnetic field proximate a south pole, or a neutral magnetic field, and a non-magnetized ferromagnetic member of a length approaching at least the spacing between the north and south pole positions of said magnetized members disposed in association with said housing means to provide an optimum flux path from said first indicium point to said second indicium point to cause said movable member to position said third indicium before said window when said housing is not disposed in a magnetic field.

4. A device for determining a magnetic field comprising a disk member magnetized along one of its diameters being characterized with a north pole and a south pole respectively at two circumference points joined by said diameter, a first indicium on said disk to indicate said north pole, a second indicium on said disk to indicate said south pole, a third indicium on said disk to indicate a neutral magnetic field, a shaft upon which said disk is mounted for rotary movement in a plane perpendicular to said shaft, housing means holding said shaft to permit said rotary movement, said housing having a window through which to observe said indicia, said first and second indicia respectively positioned before said window when said housing is respectively disposed in a magnetic field proximate a north pole and a magnetic field proximate a south pole and a non-magnetized restoring element disposed in association with said housing means to provide an optimum flux path from said north pole to said south pole to cause said disk to rotate to position said third indicium before said window device when said housing means is not disposed in a magnetic field.

5. A device for determining a magnetic field comprising a disk member magnetized along one of its diameters being characterized with a north pole and a south pole respectively at two circumference points joined by said diameter, a first indicium on said disk to indicate said north pole, a second indicium on said disk to indicate said south pole, a third indicium on said disk to indicate a neutral magnetic field, a shaft upon which said disk is mounted for rotary movement in a plane perpendicular to said shaft, housing means holding said shaft to permit said rotary movement, a window device disposed in one end of said housing means parallel to said shaft to observe said indicia, said first and second indicia respectively positioned before said window when said housing is respectively disposed in a magnetic field proximate a north pole and a magnetic field proximate a south pole and a restoring element disposed in said housing means to provide an optimum flux path from said north pole to said south pole to cause said disk to rotate to position said third indicium before said window device when said housing means is not disposed in a magnetic field, said restoring element is a ring of ferromagnetic material inserted within said housing to encompass said disk in a plane parallel to said window and in a plane perpendicular to the magnetic poles of said disk.

6. A device for determining the energized condition of a substantially inaccessible relay comprising a movable magnetized member having a north pole and a south pole characteristic, said member having three indicia thereon, respectively, indicating a north pole, south pole, and a neutral magnetic field, a housing means composed of two outer sections and one center section stacked and secured in a laminated fashion to hold said movable member for movement to position said first and second indicia when said housing means is disposed proximate said relay, a window device disposed at one end of said housing means in a plane parallel to said laminated sections' contact surfaces to observe said indicia, said outer sections of said housing composed of non-ferromagnetic material, said center section composed of ferromagnetic material in a non-magnetized state to constitute a restoring element by providing the optimum flux path from said north to said south pole causing said movable member to position said third indicia before said window when said device is not disposed adjacent said relay.

7. A device for determining the energized condition of a substantially inaccessible relay according to claim 6 wherein the other end of said housing means is a closed end of non-ferromagnetic material to be placed adjacent said relay.

8. A device for determining the energized condition of a substantially inaccessible relay according to claim 6 wherein said movable magnetized member is a disk divided into four equal segments, first of said segments bearing a first color to represent said first indicium, second of said segments bearing a second color to represent said second indicium, the third and fourth of said segments disposed on opposite sides of said disk from each other respectively between said first and second segments, and said third and fourth segments bearing an identical color to represent said third indicium.

9. A device for determining the energized condition of a substantially inaccessible relay comprising a disk member magnetized along one of its diameters being characterized with a north pole and a south pole respectively at two circumference points joined by said diameter, said disk being divided into four equal segments, first of said segments bearing a first indicium to represent said north pole, second of said segments bearing a second indicium to represent said south pole, third and fourth of said segments disposed on opposite sides of said disk from each other respectively between said first and second segments, said third and fourth segments bearing an identical third indicium to indicate a neutral magnetic field, a shaft upon which said disk is mounted for rotary movement in a plane perpendicular to said shaft, housing means in which said shaft is mounted to permit said rotary movement, said housing means composed of two outer sections and one center section stacked and secured in a laminated fashion, a window device disposed at one end of said housing means in a plane parallel to said laminated sections' contact surfaces to observe said indicia, said first and second indicia respectively positioned before said window when said housing is respectively disposed in a magnetic field proximate a north pole and a magnetic field proximate a south pole, said outer sections composed of non-ferromagnetic material, said center section composed of ferromagnetic material in a non-magnetized state formed to encompass said disk in a plane parallel to said shaft and in a plane parallel to said window to provide an optimum flux path from said north pole to said south pole to cause said disk to rotate to position said third indicium before said window device when said housing means is not disposed in a magnetic field.

References Cited in the file of this patent

UNITED STATES PATENTS

| | | |
|---|---|---|
| 1,940,521 | Acosta | Dec. 19, 1933 |
| 2,524,841 | Simkins | Oct. 10, 1950 |
| 2,585,974 | Taylor | Feb. 19, 1952 |
| 2,772,392 | Mohr | Nov. 27, 1956 |